United States Patent [19]
Lee

[11] 4,144,671
[45] Mar. 20, 1979

[54] APPARATUS FOR GROWING BEAN SPROUTS

[76] Inventor: Bo T. Lee, 2621 Garvey Ave., Alhambra, Calif. 91803

[21] Appl. No.: 840,584

[22] Filed: Oct. 11, 1977

[51] Int. Cl.² ............... A01G 31/02; A01G 27/00
[52] U.S. Cl. ............................. 47/14; 47/61; 47/62; 47/79
[58] Field of Search ............ 47/79, 14, 16, 59–65; 137/396

[56] References Cited

U.S. PATENT DOCUMENTS

| | | | |
|---|---|---|---|
| 1,031,771 | 7/1912 | Buttschau | 47/16 |
| 2,436,652 | 2/1948 | Lee | 47/14 UX |
| 2,750,713 | 6/1956 | Chin | 47/14 |
| 2,814,912 | 12/1957 | Chew | 47/14 X |
| 2,897,631 | 8/1959 | Howsley, Jr. et al. | 47/60 |
| 3,141,263 | 7/1964 | Wang | 47/79 X |
| 3,168,224 | 2/1965 | Rios | 47/79 X |
| 3,328,912 | 7/1967 | Poon | 47/61 |
| 3,616,560 | 11/1971 | Mun | 47/61 |
| 3,768,201 | 10/1973 | Yoo | 47/16 |
| 3,945,148 | 3/1976 | Oyama | 47/14 |
| 4,006,843 | 2/1977 | Martinez | 47/79 X |

FOREIGN PATENT DOCUMENTS

| | | | |
|---|---|---|---|
| 201922 | 7/1958 | Austria | 47/79 |
| 1141377 | 9/1957 | France | 47/61 |
| 1218557 | 5/1960 | France | 47/14 |
| 30203 | 1/1911 | Sweden | 47/79 |

*Primary Examiner*—Edgar S. Burr
*Assistant Examiner*—Steven A. Bratlie
*Attorney, Agent, or Firm*—Whann & McManigal

[57] ABSTRACT

A self watering apparatus for home growing bean sprouts includes a housing divided into an upper compartment and a lower compartment by a horizontally positioned divider plate provided with orifices. An open top sprout container tray is placed within the lower compartment of the housing, the bottom of the sprout containing tray is provided with a drainage opening. A tilting water container is pivotally mounted in the upper compartment of the housing, the tilting water container has an established capacity and collects water from a water supply line at a controlled rate. Each time the volume of water collected in the tilting water container reaches the established capacity, the tilting water container discharges the collected water on the divider plate and drains through the orifices into the open top sprout container tray. The method disclosed in this invention produces healthier, crisper, better tasting, well formed bean sprouts in a high yield by weight of sprouts produced, from a given weight of bean seed placed in the sprout container tray. This is accomplished by selecting the correct interval between successive watering periods and by maintaining the temperature of the water periodically wetting the bean seed and developing bean sprouts within the established range. The water is permitted to drain freely from the seeds and partly developed sprouts. The apparatus and method of this invention minimizes the formation of hair roots on the developing bean sprouts.

4 Claims, 4 Drawing Figures

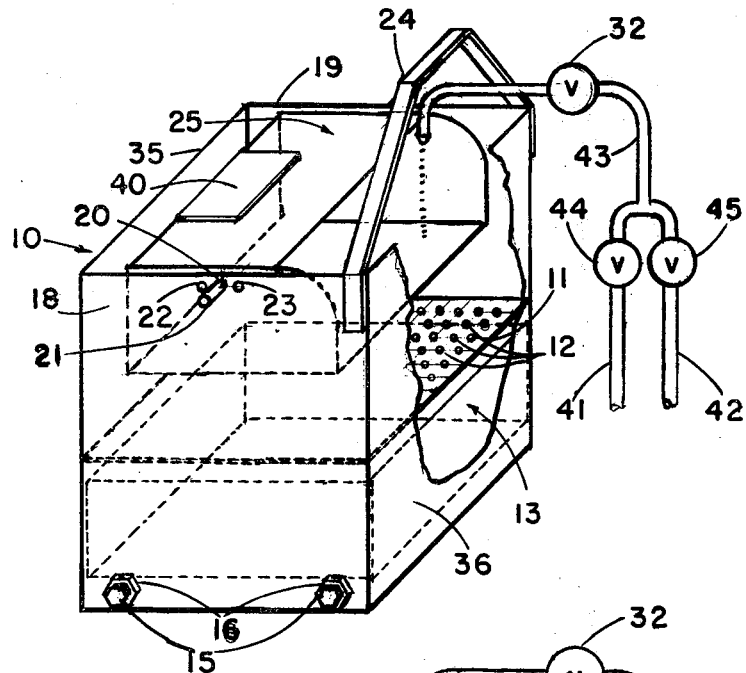
Fig. 1
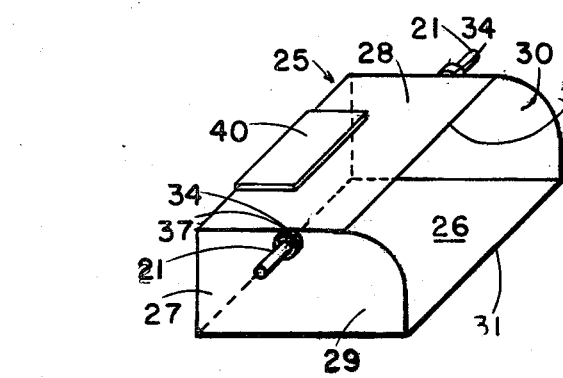
Fig. 2
Fig. 4
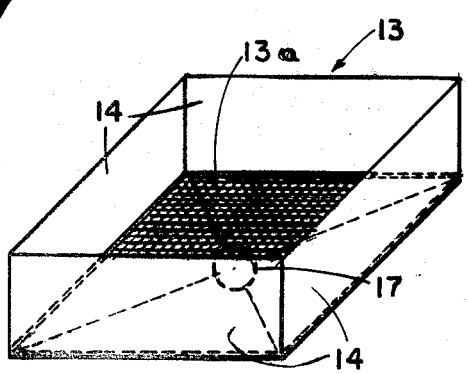
Fig. 3

APPARATUS FOR GROWING BEAN SPROUTS

This invention relates to means for germinating bean seed and developing bean sprouts therefrom, and more particularly to a self-watering bean sprout growing apparatus suitable for home-growing high quality bean sprouts in a quantity sufficient to supply the needs of the average family.

BACKGROUND OF THE INVENTION

Bean sprouts have been grown and harvested, usually in oriental countries, for many thousands of years but the production has been limited due to the amount of labor involved. At the present time commercial growers produce as much as fifty thousand pounds of bean sprouts per day. The high nutritional value of bean sprouts has been discovered by the public and has created this demand for bean sprouts to supply the needs of large markets, restaurants, and the like.

The equipment used by commercial growers requires considerable space, is quite bulky and is usually set up for commercial production at a permanent location. Commercial installations normally require expensive control equipment and would not be practical for growing the limited quantity of bean sprouts required by a single family.

Many techniques in use today produce poor yields of bean sprouts based on the weight of bean seed used. The dark, moist, warm conditions usually present in the sprout growing chambers favor the rapid growth of bacteria and when the bacteria present in growing chamber reaches a sufficient level it will promote the growth of algae which will cause substantial spoilage of the bean sprout crop produced. Those sprouts that are not spoiled will not have the best flavor, will not attain the desired size and shape, and will usually be unhealthy looking.

Some current growing processes have tried mechanically stirring the growing sprouts during each wetting period. The best results have been obtained when the growing sprouts are not unduly disturbed from the time the bean seeds have been placed in the growing chamber until the time the fully developed bean sprouts are ready for removal from the apparatus.

SUMMARY OF THE INVENTION

The present invention provides a homegrowing apparatus that is satisfactory for producing the quantity of bean sprouts required to meet the needs of an average family. The apparatus is portable, is inexpensive, can be set up at any convenient location, requires little space, and produces high quality bean sprouts.

The apparatus automatically wets the germinated bean seeds and developing beam sprouts with fresh water that is uniformly distributed over the sprouting chamber at the predetermined interval, throughout the entire growing period. The water drains freely from the sprouts and leaves the growing tray through a discharge opening in its bottom. This prevents the seeds and partly developed bean sprouts from "drowning" or rotting which is caused by prolonged submergence. The maximum interval between successive waterings that still provides adequate moisture for the growing sprouts has been determined to be four hours. The minimum interval between successive waterings that that will not leave the bean sprouts too wet for proper development is two hours. The correct amount of moisture throughout the entire growing period will insure better tasting, healthier, crisper, and better shaped bean sprouts.

OBJECTIVES OF THE INVENTION

The primary object of this invention is to provide a home growing apparatus for producing bean sprouts that is portable, can be set up at any desired location, requires little space, and is capable of automatically watering the growing bean sprouts at predetermined intervals between successive waterings, thereby substantially eliminating the labor normally required for the proper watering of the crop during the entire growing period.

A further object of this invention is to provide a simple, inexpensive apparatus for growing bean sprouts, that is provided with a self righting, tilting water container pivotally mounted within the upper external portion of the apparatus. A continuous drip of water from an adjustable valve fitted to the end of a water supply line positioned above the container, introduces water at the required rate into the titing container throughout the entire growing period. The water is discharged from the container each time it is gravity actuated to tilt, the water discharged from the container is uniformly distributed over the germinating bean sprouts.

Another object of this invention is to obtain a high yield by weight of sprouts produced from a given weight of bean seed placed in the apparatus. The apparatus and method set forth in the present invention will produce from eight to nine pounds of bean sprouts for each pound of mung bean seeds germinated, if correctly used. The normal ratio obtained by most home growing apparatuses and methods is between four to five pounds of sprouts for each pound of bean seed used.

Another object of this invention is to provide a new apparatus and method for producing tastier, crisper, healthier looking, and better shaped bean sprouts.

Another object of this invention is to minimize the formation of hair roots on the developing bean sprouts.

Other objects of this invention will become apparent from the following detailed description of a preferred embodiment of the invention when read in connection with the accompanying drawings.

BRIEF DESCRIPTION OF THE DRAWINGS

FIG. 1 is a perspective view, partly broken away, showing the assembled apparatus according to the present invention.

FIG. 2 is a perspective view showing more clearly the tilting water container that is pivotally mounted within the upper portion of the external housing shown in FIG. 1.

FIG. 3 is a perspective view of the sprout containing tray that fits inside the lower portion of external housing shown in FIG. 1 in which the developing bean sprouts are contained.

FIG. 4 shows an alternative arrangement for automatically controlling the flow of hot water into the water supply line to maintain the temperature of the water therein at the desired level.

DESCRIPTION OF THE PREFERRED EMBODIMENTS

The apparatus for home growing bean sprouts according to the present invention comprises an external housing 10 that is substantially rectangular in outline and is constructed of any suitable opaque sheet material such as sheet metal. Housing 10 is open at the top and bottom. A horizontally disposed divider plate 11, also made of opaque sheet material, is permanently fastened inside housing 10 at a position that is preferably a short distance below the horizontal plane passing through the midpoint between the upper and lower open ends of housing 10. Plate 11 separates housing 10 into an upper compartment and a lower compartment. The horizontal surface of divider plate 11 is provided with a plurality of uniformly spaced small orifices 12 that are preferably 1/16" or ⅛" in diameter. These orifices extend through divider plate 11.

The lower portion of housing 10 is provided with a suitable means for supporting the bottom of sprout germinating tray 13 that is open at the top and is provided with substantially vertical sides 14 that can snugly slide into the lower compartment of housing 10 and when inserted into the lower compartment will be positioned to receive water flowing through orifices 12 of divider plate 11. The bottom of tray 13 may be supported within the lower compartment of housing 10 by the shank portion of bolts 15 that thread into nuts 16, permanently attached to the outer surface of housing 10 over clearance holes located near the lower end of housing 10. Any other suitable means for supporting the bottom of tray 13 within the lower compartment of housing 10 may be used. The supporting means described permit bolts 15 to be easily withdrawn when germinating tray 13 is to be removed from housing 10. The bottom of tray 13 is provided with a suitable drainage opening 17 to insure rapid and complete drainage of water reaching the bottom of tray 13, the bottom slopes slightly toward opening 17 to facilitate the exit of water. Horizontal screen 13a is placed above and adjacent the bottom. Without proper drainage the bean seed and growing sprouts could become submerged in water for a considerable time and this could result in the formation of algae by the bacteria that are usually present. The presence of algae is undesirable since they detrimentally affect the quality of the bean sprouts produced and can cause spoilage of a substantial part of the crop due to rotting.

The upper portion of housing 10 is provided at each end 18 and 19 with a centrally positioned hole 20 that is close to the upper edge of each respective end. Holes 20 are preferably three eighths of an inch in diameter and support shaft or axle 21 that fits snugly in holes 20 and is appreciably longer than the distance between ends 18 and 19. Additional holes 22 and 23 having the same diameter as holes 20 are equally spaced a short distance on each side of each hole 20 with their centers lying on the horizontal plane that passes through the center of each respective hole 20; this permits locating axle 21 on one side or the other of center, should this be necessary. A handle 24 is permanently attached to the corresponding positions of ends 18 and 19 and extends above housing 10. Handle 24 facilitates moving the apparatus when it is required.

Tilting water container 25, also made of opaque material, is substantially boxlike in shape and comprises a bottom 26 to which there is attached at one side a closed side 27 that extends upwardly at substantially 90° from the bottom. The top edge of side 27 is attached to top 28 which forms substantially a 90° angle with closed side 27. Top 28 is shorter in width than bottom 26. Ends 29 and 30 extend from closed side 27 to the other edge 31 of bottom 26 and are attached to the corresponding edges of bottom 26, closed side 27, and top 28 to form a container capable of collecting a charge of water whenever the lower edge of closed side 27 is positioned lower than the horizontal plane assumed by bottom 26 when the container is level. The side of tilting container 25 adjoining edge 31 of bottom 26 is open and since top 28 is not as wide as bottom 26, a considerable space is provided into which water from an adjustable valve 32, positioned above container 25, can drip into the container when it is in receiving position. That portion of ends 29 and 30 that extends between edge 33 of top 28 and edge 31 of bottom 26 is preferably curved as shown in the drawings.

The distance between ends 18 and 19 of housing 10 is greater than the distance between end plates 29 and 30 of container 25. This permits tilting container 25 to pivot within the upper compartment of housing 10 when it is longitudinally mounted on axle 21. Suitable spacers 34 are placed on axle 21 between housing 10 and the ends of tilting container 25 to hold container 25 at the correct position to allow it to pivot freely on axle 21 in the upper compartment of housing 10. The width of bottom 26 of container 25 is considerably less than the distance between sides 35 and 36 of housing 10. This permits all parts of tilting container 25 to clear sides 35 and 36 of housing 10 when it pivots on axle 21.

Tilting container 25 is provided with a hole 37 in each of ends 29 and 30 to permit passage of axle 21. Holes 37 are positioned close to top 28 on the respective end with the center of each hole 37 positioned closer to side 27 of the tilting container than the open side. A counterweight 40 is attached to top 28 with one edge adjacent to the top of closed side 27. The opposite edge of counterweight 40 extends a sufficient distance toward edge 33 of top 28 to insure proper counterbalance for returning the lower edge of closed side 27 to the position where it will again permit water to collect in container 25 after each time a charge of water is dumped from tilting container 25.

The rate at which water drips into tilting container 25 is controlled by adjustable valve 32. As water first starts to collect in empty tilting container 25, it will first collect against closed side 27 and the added weight of the water will cause the lower edge of closed side 27 to pivot still lower than the position it occupied when tilting container 25 was returned by counterweight 40 following the dumping of the previous charge of water from container 25. As the water progressively rises in container 25 more of the surface of bottom 26 will become covered and the added weight of the water on bottom 26 will cause container 25 to progressively pivot toward the horizontal position. When the entire surface of bottom 26 has become covered by the water, bottom 26 will be horizontal and the water collected in container 25 will spill over edge 31 of bottom 26 and fall on divider plate 11 where it will pass through orifices 12 into sprouting tray 13 to water the bean seeds and partly developed bean sprouts for a short time before it drains from sprouting tray 13 through discharge opening 17. When the charge of water has been dumped from the tilting container 25, counterweight 40 will return container 25 to the position where it can again start to collect the next charge of water and the cycle is repeated. Counterweight 40 may also be attached to container 25 at any other position on or adjacent to side 27.

The method used in this invention for growing each batch of bean sprouts is as follows: the required weight of mung bean or other type of bean seeds is evenly distributed on horizontal screen 13a adjacent to the bottom of sprout container tray 13 without obstructing drainage opening 17. Tray 13 is then introduced into the lower compartment of housing 10 and bolts 15 are threaded into nuts 16 a sufficient distance to permit the bottom of tray 13 to rest on bolts 15. When sprouting tray 13 is supported by bolts 15 the open top of the tray will be below horizontal divider plate 11 and in position to receive any water flowing through uniformly spaced orifices 12.

It is essential that there is substantially no light in the sprout growing chamber during the entire time the bean sprouts are developing. Any appreciable amount of light in the growing chamber will cause the bean sprouts to develop small, stiff, green leaves on the sprouts that give the sprouts an undesirable flavor. Since external housing 10 and divider plate 11 are opaque, the only light that could enter the lower compartment of housing 10 would have to pass through small orifices 12. Tilting container 25 is also opaque and when it is mounted on axle 21 will be within the upper compartment of housing 10 and will block passage of most of the light that would otherwise enter through the open top of housing 10. The only light that can reach small orifices 12 in divider plate 11 is the light entering the gap between tilting container 25 and the sides of housing 10. This is small and as a result the lower compartment of housing 10 will be substantially dark.

The selection of the correct time interval between successive watering periods is important since it is one of the controlling factors that determines the quality, size and weight of the crop of bean sprouts produced. It has been found that the maximum time interval between successive watering periods should not exceed four hours and the minimum time interval between successive watering periods should not be less than two hours. When the interval of time between successive watering periods exceeds four hours, the developing bean sprouts will become too dry due to lack of sufficient moisture and as a result will develop hair roots on the sprouts that try to find sufficient moisture. The formation of these hair roots has been a common problem with existing home growing methods for producing bean sprouts. The presence of hair roots on bean sprouts adversely affects the quality, size and flavor of the sprouts developed. The method according to the present invention has the advantage that it minimizes the formation of hair roots. The flow of water through orifices 12 following each discharge of water on divider plate 11 causes sufficient agitation of the growing sprouts to permit the few hair roots that start to form on adjacent sprouts to become disengaged from the sprouts and once they are no longer attached to the sprouts they are removed from sprouting tray 13 by the water when it drains through opening 17.

When the interval between successive watering periods is less than two hours, the bean sprouts will retain too much water and this can cause the bean sprouts to "drown" and can start rotting. This usually results in a substantial spoilage of the sprout crop.

The time interval selected between successive watering periods should be determined before each batch is started and should take into consideration existing ambient conditions at the location where the sprouts are to be grown. The time interval selected should normally be used from the time the bean seeds are placed in the apparatus to start germinating until the fully matured bean sprouts are ready for removal from the apparatus.

Correct selection of the time interval between successive watering periods will permit the water to wash away most of the bacteria that normally accumulate in the sprouting tray and growing chamber between washings. If sufficient bacteria should accumulate in the developing bean sprouts, the bacteria will promote the growth of algae and algae can cause spoilage of a substantial part of the bean sprout crop as well as lowering the quality of the bean sprouts that do not spoil.

The temperature of the water that collects in tilting container 25 should be maintained between 72° F. and 84° F. depending on the air temperature at the site where the apparatus is set up. The temperature of the water dripping from adjustable valve 32 is controlled by mixing water from cold water line 41 with the correct amount of water from hot water line 42 in water supply line 43, adjustable valve 32 is fitted to the discharge end of line 43. The flow of cold water from line 41 is controlled by adjustable valve 44 and the flow of hot water from line 42 is controlled by adjustable valve 45. Should frequent adjustments be necessary to control the flow of hot water entering water supply line 43 to maintain the water dripping from valve 32 at the required temperature, when the air temperature surrounding the apparatus fluctuates considerably during different times of each day, the adjustments can be made automatically by employing a thermostat 46 that opens or closes thermostatically controlled valve 47 which varies the flow of hot water into water supply line 43 to maintain the desired temperature of the water dripping from valve 32. Thermostat 46 is placed in contact with water supply line 43 near adjustable valve 32 to regulate the temperature of the water leaving water supply line 43. This alternative arrangement is shown in FIG. 4.

If the temperature of the water wetting the developing bean sprouts is lower than 72° F., the bean sprouts will require a longer time than normal, to attain full maturity. The bean sprouts reach full maturity in five days when the water temperature is maintained between 72° F. and 84° F.

When the temperature of the water wetting the bean sprouts is lower than 60° F., the bean sprouts will stop developing and will die and start to decay.

Should the temperature of the water wetting the bean sprouts be higher than 84° F., the bean sprouts will develop too rapidly and will be thin, stringy, poorly shaped, and low in quality.

While a preferred embodiment of the novel apparatus for home growing edible bean sprouts has been described herein, it is intended that various changes and further arrangements, as well as modifications may be made without departing from the scope of the invention.

I claim:

1. Apparatus for home growing of bean sprouts, comprising:
    (a) an external housing having an opaque surrounding side wall providing top and bottom openings;
    (b) an opaque, horizontally disposed divider plate within the housing attached peripherally to said housing side wall to separate said housing into an upper compartment and a lower compartment, said divider plate being formed with a plurality of uniformly spaced orifices extending therethrough;
    (c) a bean sprout container tray having an outer wall extending upwardly from a sloping bottom connected with a drainage outlet, and an open top, said tray being topwise insertable into the lower compartment through the bottom opening of said housing, the outer wall of said tray being conformed to closely fit within the bottom wall opening of the housing and in the inserted position forming a closure for the bottom opening of the housing;

(d) a controlled water supply line having an outlet positioned above the top opening of said housing for releasing water at a predetermined rate; and (e) a self-righting tilt container pivotally mounted in the upper compartment of said housing above the divider plate for gravitally receiving successive container tilting charges of water from the supply line outlet, said tilt container in its normal non-tilted position providing a closure for the top opening of said housing.

2. Apparatus according to claim 1, in which:
a screen member is peripherally supported in a position above the sloping bottom of said tray.

3. Apparatus according to claim 1, in which:
a carrying handle extends above and bridges the top opening of said housing.

4. Apparatus according to claim 1, including:
means for releasably securing the sprout container tray, in said inserted position, to said housing.

* * * * *